(12) United States Patent
Kitahara

(10) Patent No.: US 9,549,092 B2
(45) Date of Patent: Jan. 17, 2017

(54) PRINTER PROVIDING A PLURALITY OF PRINT TYPES AND HAVING A PLURALITY OF PRINT FUNCTIONS, AND PRINTER SYSTEM

(71) Applicant: KYOCERA Document Solutions Inc., Osaka-shi, Osaka (JP)

(72) Inventor: Keiya Kitahara, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/867,029

(22) Filed: Sep. 28, 2015

(65) Prior Publication Data

US 2016/0094750 A1 Mar. 31, 2016

(30) Foreign Application Priority Data

Sep. 29, 2014 (JP) .................. 2014-199279
Sep. 29, 2014 (JP) .................. 2014-199280

(51) Int. Cl.
*H04N 1/00* (2006.01)

(52) U.S. Cl.
CPC ........ *H04N 1/00925* (2013.01); *H04N 1/0057* (2013.01); *H04N 1/0066* (2013.01); *H04N 1/00477* (2013.01); *H04N 1/00604* (2013.01); *H04N 1/00639* (2013.01); *H04N 2201/0094* (2013.01)

(58) Field of Classification Search
CPC .............. H04N 1/00925; H04N 1/0057; H04N 1/00604; H04N 1/00639

USPC ......................................... 358/1.13, 1.9, 2.1
See application file for complete search history.

(56) References Cited

U.S. PATENT DOCUMENTS

2003/0230842 A1* 12/2003 Shiho ...................... B65H 3/44
                                                        271/9.01
2008/0030523 A1*  2/2008 Takami ................... H04N 1/38
                                                        345/619
2014/0362390 A1* 12/2014 Takahata ............... G06F 3/1254
                                                        358/1.9

FOREIGN PATENT DOCUMENTS

JP    H07271246 A    10/1995
JP    H11032139 A     2/1999
JP    2008281666 A   11/2008

* cited by examiner

*Primary Examiner* — Jamares Q Washington

(57) ABSTRACT

A printer includes a first determination unit, a first receiving unit, a second determination unit, a second receiving unit, and a controller. The first receiving unit receives a setting of a print type determined to be settable by the first determination unit and inhibits a setting of a print type determined to be unsettable by the first determination unit. The second receiving unit receives a setting of a print function determined to be settable by the second determination unit and inhibits a setting of a print function determined to be unsettable by the second determination unit. The controller controls a printing unit so that the printing unit prints an image on the paper sheet, in accordance with the data input by the input unit, the print type received by the first receiving unit, and the setting of the print function received by the second receiving unit.

10 Claims, 12 Drawing Sheets

PRINTER PROVIDING A PLURALITY OF PRINT TYPES AND HAVING A PLURALITY OF PRINT FUNCTIONS, AND PRINTER SYSTEM

INCORPORATION BY REFERENCE

The disclosures of Japanese Patent Applications Nos. 2014-199279 and 2014-199280 filed on Sep. 29, 2014 including the specifications, drawings, and abstracts are incorporated herein by reference in their entireties.

BACKGROUND

The present disclosure relates to a printer and a printer system.

In an image forming apparatus typified by a digital multifunctional peripheral or the like, an image of a document is read by an image reading unit and a photoreceptor included in an image forming unit is irradiated with light based on the read image so that an electrostatic latent image is formed on the photoreceptor. A developer such as charged toner is supplied onto the electrostatic latent image to form a visible image, which is transferred and fixed onto a paper sheet that has been fed. The sheet is then discharged to the outside of the apparatus.

Techniques regarding paper feed in image forming apparatuses are known to date.

As a feature of a typical image forming apparatus, the typical image forming apparatus includes a mode setting means for setting a manual feed mode in which a recording material is manually fed and a material setting means for setting the type of the recording material to be manually fed in accordance with the setting of the manual feed mode by the mode setting means.

When a printout request is issued in a state where a first or second paper feed tray is selected as a paper feed tray dedicated to a printer, the typical image forming apparatus determines details of the request. If the request is for a printout of image data from a computer, paper feed from the paper feed tray selected as the paper feed tray dedicated to the printer is permitted. Thereafter, a paper sheet is fed from a paper feed tray designated by the computer. In the typical image forming apparatus, if the request is for a printout of image data received by facsimile, paper feed from the paper feed tray selected as the paper feed tray dedicated to the printer is inhibited, and a paper sheet of fed from another paper feed tray.

The typical image forming apparatus includes a plurality of paper cassettes, and a printing unit performs printing in response to a selective supply of paper from the paper cassettes. The image forming apparatus includes a cassette function memory unit that stores functions capable of being processed for the paper cassettes, an input unit that can select a function and input a priority setting, and a cassette selecting unit that selects a paper cassette based on a function entered by the input unit with priority and the function that can be processed for each of the paper cassettes stored in the cassette function memory unit.

SUMMARY

In an aspect of the present disclosure, a printer provides a plurality of print types and has a plurality of print functions. The printer includes a printing unit, a paper loading unit, an input unit, a first determination unit, a first receiving unit, a second determination unit, a second receiving unit, and a controller. The printing unit prints an image on a paper sheet. The paper loading unit loads the paper sheet on which an image is to be printed by the printing unit. The input unit inputs at least one of data on a sheet size or data on a medium type of the paper sheet loaded on the paper loading unit. The first determination unit determines whether one of the plurality of print types is settable or not to the paper sheet loaded on the paper loading unit, based on the data input by the input unit. The first receiving unit receives a setting of at least one of the print types determined to be settable by the first determination unit and inhibits a setting of at least one of the print types determined to be unsettable by the first determination unit. The second determination unit determines whether one of the plurality of print functions is settable or not to the paper sheet loaded on the paper loading unit, based on the data input by the input unit. The second receiving unit receives a setting of at least one of the print functions determined to be settable by the second determination unit and inhibits a setting of at least one of the print functions determined to be unsettable by the second determination unit. The controller performs printing of an image by the printing unit on the paper sheet loaded on the paper loading unit, in accordance with the data input by the input unit, the print type received by the first receiving unit, and the setting of the print function received by the second receiving unit.

In another aspect of the present disclosure, a printer system includes a printer providing a plurality of print types and having a plurality of print functions, and a computer connected to the printer and capable of requesting printing to the printer. The printer includes a printing unit, a paper loading unit, an input unit, a first determination unit, a first receiving unit, a second determination unit, a second receiving unit, and a controller. The printing unit prints an image on a paper sheet. The paper loading unit loads the paper sheet on which an image is to be printed by the printing unit. The input unit inputs at least one of data on a sheet size or data on a medium type of the paper sheet loaded on the paper loading unit. The first determination unit determines whether one of the plurality of print types is settable or not to the paper sheet loaded on the paper loading unit, based on the data input by the input unit. The first receiving unit receives a setting of at least one of the print types determined to be settable by the first determination unit and inhibits a setting of at least one of the print types determined to be unsettable by the first determination unit. The second determination unit determines whether one of the plurality of print functions is settable or not to the paper sheet loaded on the paper loading unit, based on the data input by the input unit. The second receiving unit receives a setting of at least one of the print functions determined to be settable by the second determination unit and inhibit a setting of at least one of the print functions determined to be unsettable by the second determination unit. The controller performs printing of an image by the printing unit on the paper sheet loaded on the paper loading unit, in accordance with the data input by the input unit, the print type received by the first receiving unit, and the setting of the print function received by the second receiving unit.

DETAILED DESCRIPTION

Figure 1:
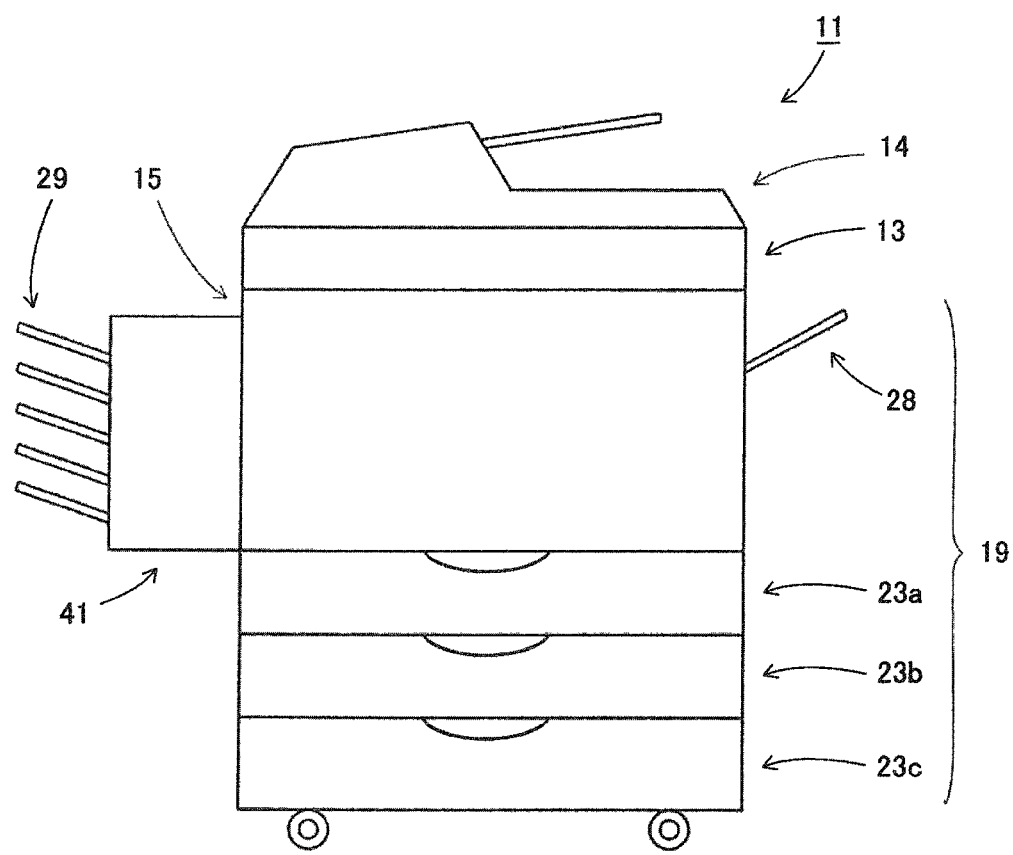
FIG. 1 schematically illustrates an appearance of a digital multifunctional peripheral to which a printer according to an embodiment of the present disclosure is applied.
Figure 2:
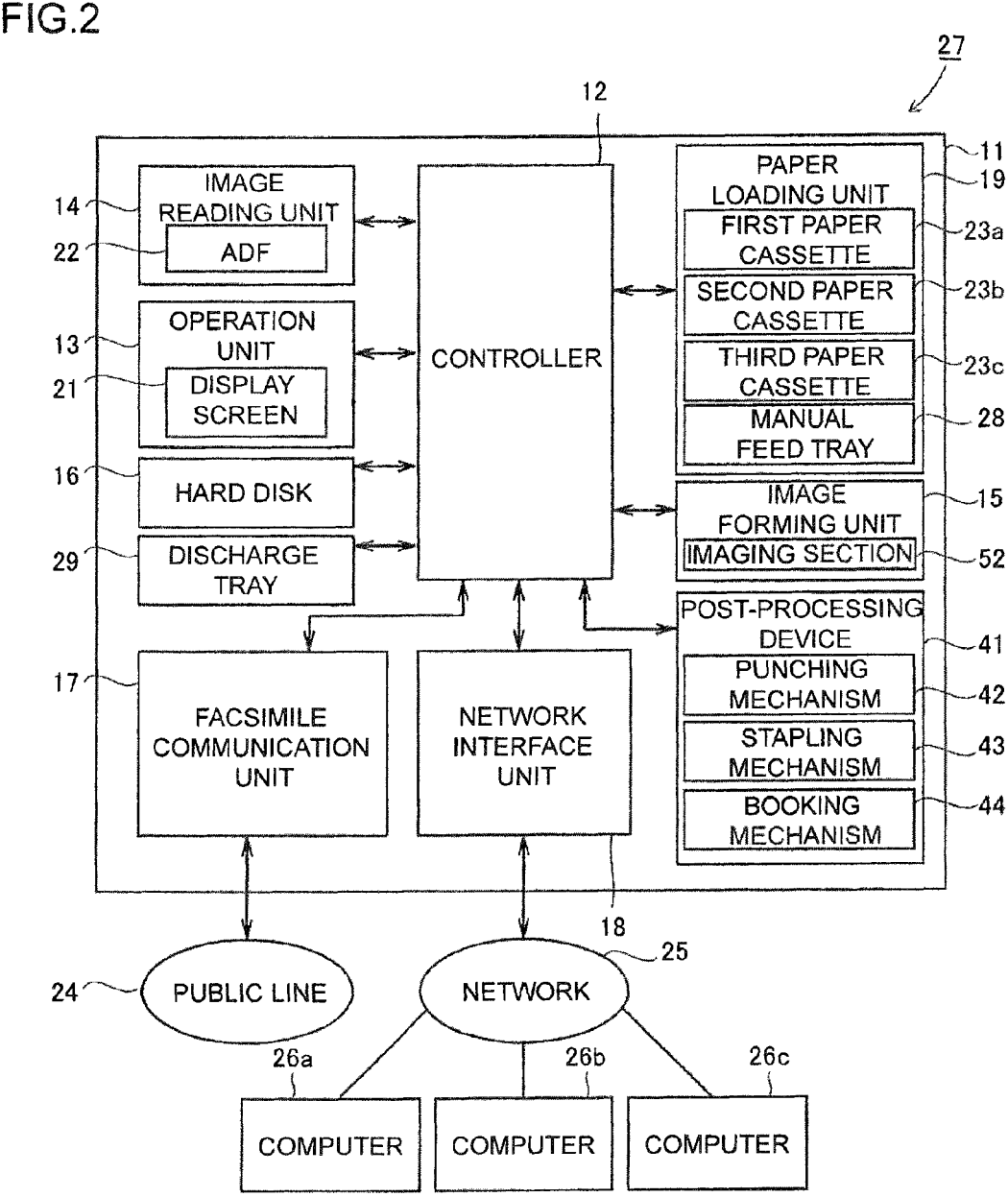
FIG. 2 is a block diagram showing a configuration of the digital multifunctional peripheral to which the printer according of the embodiment is applied.

An embodiment of the present disclosure will be hereinafter described. First, a configuration of a digital multifunctional peripheral to which a printer according to an embodiment of the present disclosure is applied will be described. FIG. 1 schematically illustrates an appearance of the digital multifunctional peripheral to which the printer according to the embodiment of the present disclosure is applied. FIG. 2 is a block diagram illustrating a configuration of the digital multifunctional peripheral to which the printer according to the embodiment is applied.

Referring to FIGS. 1 and 2, a digital multifunctional peripheral 11 includes a controller 12, an operation unit 13, an image reading unit 14, a paper loading unit 19, an image forming unit 15, a discharge tray 29, a hard disk 16, a facsimile communication unit 17, and a network interface unit 18 for connection to a network 25, and a post-processing device 41. The controller 12 controls the entire digital multifunctional peripheral 11. The operation unit 13 includes a display screen 21 that displays information issued from the digital multifunctional peripheral 11 and entries made by a user. The operation unit 13 enables the user to input image forming conditions, such as the number of copies and gradation degree, and to turn a power supply on or off. The image reading unit 14 includes an auto document feeder (ADF) 22 that automatically conveys documents loaded thereon to a reading unit and reads images on the documents. The paper loading unit 19 includes a manual feed tray 28 on which paper sheets are manually loaded, and a first paper cassette 23a, a second paper cassette 23b, and a third paper cassette 23c each of which accommodates a plurality of paper sheets so that paper sheets on which images are to be formed are loaded thereon. The image forming unit 15 forms an image based on an image that has been read out and image data transmitted via the network 25. The discharge tray 29 discharges a paper sheet on which an image has been formed by the image forming unit 15. The hard disk 16 stores transmitted image data and input image forming conditions, for example. The facsimile communication unit 17 is connected to a public line 24 and performs facsimile transmission and reception. The post-processing device 41 includes a punching mechanism 42 that punches a sheet on which an image has been formed near an end thereof, a stapling mechanism 43 that staples a plurality of sheets on which images have been formed near ends thereof, and a bookbinding mechanism 44 that performs bookbinding by folding a plurality of sheets on which images have been formed. The post-processing device 41 for performing post-processing on paper sheets is called a finisher, and is detachably attached to the digital multifunctional peripheral 11. The digital multifunctional peripheral 11 includes, for example, a dynamic random access memory (DRAM) that reads and writes image data, which is neither shown nor described herein. Arrows in FIG. 2 indicate flows of control signals and data on control and images.

The digital multifunctional peripheral 11 operates as a copier by causing the image forming unit 15 to form an image by using image data of a document read by the image reading unit 14. That is, the digital multifunctional peripheral 11 includes copy printing as a print type. The digital multifunctional peripheral 11 operates as a printer by receiving image data transmitted via the network interface unit 18 from computers 26a, 26b, and 26c connected to the network 25 and causing the image forming unit 15 to form an image by using the image data and print the image on paper. That is, the digital multifunctional peripheral 11 includes printer printing as a print type. The image forming unit 15 operates as a printing unit that prints requested images. The digital multifunctional peripheral 11 operates as a facsimile by receiving image data transmitted from the public line 24 through the facsimile communication unit 17 and causing the image forming unit 15 to form an image by using the image data via the DRAM or by transmitting image data of a document read by the image reading unit 14 to the public line 24 through the facsimile communication unit 17. That is, the digital multifunctional peripheral 11 includes facsimile printing as a print type. The digital multifunctional peripheral 11 has a plurality of functions, such as a copying function, a printer function, and a facsimile function, relating to image processing. The digital multifunctional peripheral 11 also has a function of minutely setting each of the functions.

A printer system 27 according to an embodiment of the present disclosure includes the digital multifunctional peripheral 11 and the computers 26a, 26b, and 26c. Specifically, the printer system 27 includes the digital multifunctional peripheral 11 having the configuration described above, and the computers 26a, 26b, and 26c connected to the digital multifunctional peripheral 11 through the network 25.

In this embodiment, the three computers 26a to 26c are provided. Each of the computers 26a to 26c can issue a print request to the digital multifunctional peripheral 11 through the network 25 to perform printing. The digital multifunctional peripheral 11 may be connected to the computers 26a to 26c by wires such as local area network (LAN) cables or may be connected wirelessly. In addition, other digital multifunctional peripherals and servers may be connected in the network 25.

Figure 3:
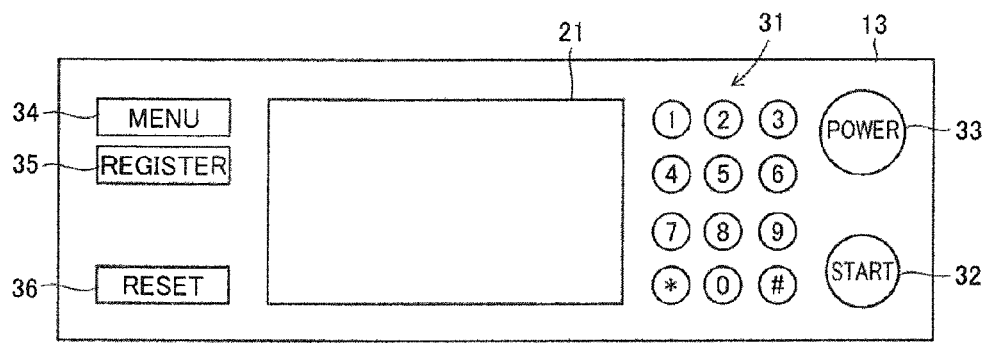
FIG. 3 schematically illustrates an appearance of a configuration of an operation unit.

Next, the configuration of the operation unit 13 described above will be further described in detail. FIG. 3 schematically illustrates an appearance of a configuration of the operation unit 13. Referring to FIG. 3, the operation unit 13 includes numeric keys 31 including number keys 0 to 9 for inputting the number of copies or the like and symbol keys such as "*" and "#", a start key 32 for instruction to start printing and facsimile transmission, a power key 33 for turning on and off the power supply of the digital multi-function peripheral 11, a menu key 34 for indicating selection from functions, such as a printer function and a copying function, of the digital multi-function peripheral 11, a register key 35 for instruction to register various image forming conditions and user information, a reset key 36 for cancelling the instructions input by the user with the numeric keys 31 and other keys, and the display screen 21 described above. The display screen 21 is a liquid crystal display with a touch panel function that allows a user to input image forming conditions and the like and to select a function, for example, by depressing the display screen 21 with a finger.

Figure 4:
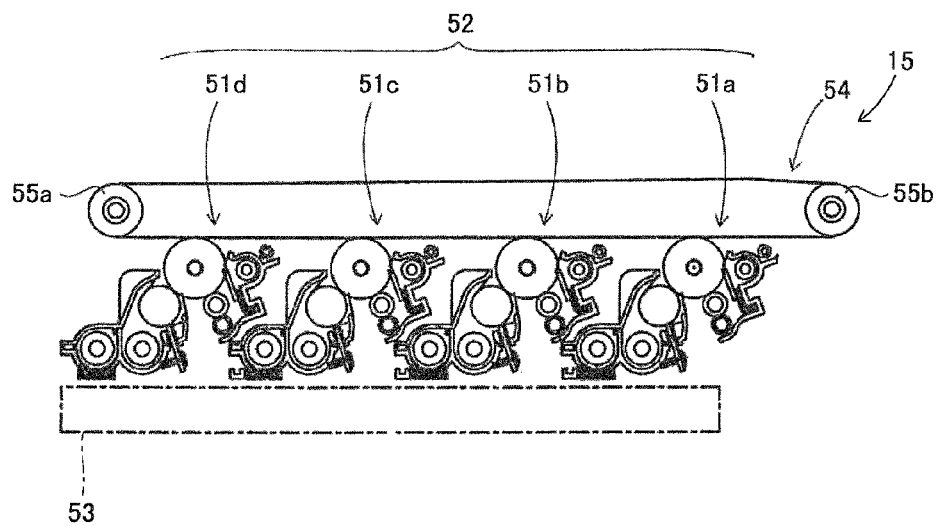
FIG. 4 schematically illustrates a configuration of an image forming unit.

Then, the configuration of the image forming unit 15 included in the digital multifunctional peripheral 11 will be further described in detail. FIG. 4 is a sectional view schematically illustrating a configuration of the digital multifunctional peripheral 11 according to the embodiment of the present disclosure. In FIG. 4, hatching of the components are omitted in order to ease understanding. FIG. 4 is a sectional view of the digital multifunctional peripheral 11 taken along a vertical plane.

Referring to FIG. 4, the image forming unit 15 includes an imaging section 52 including four imaging units 51a, 51b, 51c, and 51d corresponding to four colors of yellow, magenta, cyan, and black, respectively, a laser scanner unit (LSU) 53 for irradiating the four imaging units 51a to 51d based on an image read by the image reading unit 14, and a transfer belt 54 serving as an intermediate transfer member onto which visible images formed by the imaging units 51a to 51d are temporarily transferred. The transfer belt 54 is endless. While the transfer belt 54 is being rotated in one direction by a pair of drive rollers 55a and 55b, visible images formed by the four imaging units 51a to 51d corresponding to the four colors of yellow, magenta, cyan, and black are transferred onto the transfer belt 54. Thereafter, the visible images transferred onto the transfer belt 54 are transferred onto a conveyed sheet, and are fixed onto the sheet with an unillustrated fixing unit. The sheet is then discharged to the outside of the digital multifunctional peripheral 11, specifically onto the discharge tray 29. The digital multifunctional peripheral 11 can perform monochrome printing using only the imaging unit 51d corresponding to black. The digital multifunctional peripheral 11 can also perform color printing using at least one of the imaging unit 51a corresponding to yellow, the imaging unit 51b corresponding to magenta, and the imaging unit 51c corresponding to cyan.

Next, a case where A6-size ordinary paper is loaded on the first paper cassette 23a in the digital multifunctional peripheral 11 according to the embodiment of the present disclosure will be described. In this case, a user as an operator of the printer uses the digital multifunctional peripheral 11 and loads A6-size ordinary paper on the first paper cassette 23a located at the uppermost level among the first through third paper cassettes 23a to 23c and to determine settings of the first paper cassette 23a. In this embodiment, A6 size is selected as a sheet size, and ordinary paper is selected as a medium type. The A6-size ordinary paper used in this case is a paper sheet on which an image has been already printed on a back surface thereof, i.e., one of the surfaces thereof, and printing can be performed only on the other surface of the sheet.

Figure 5:
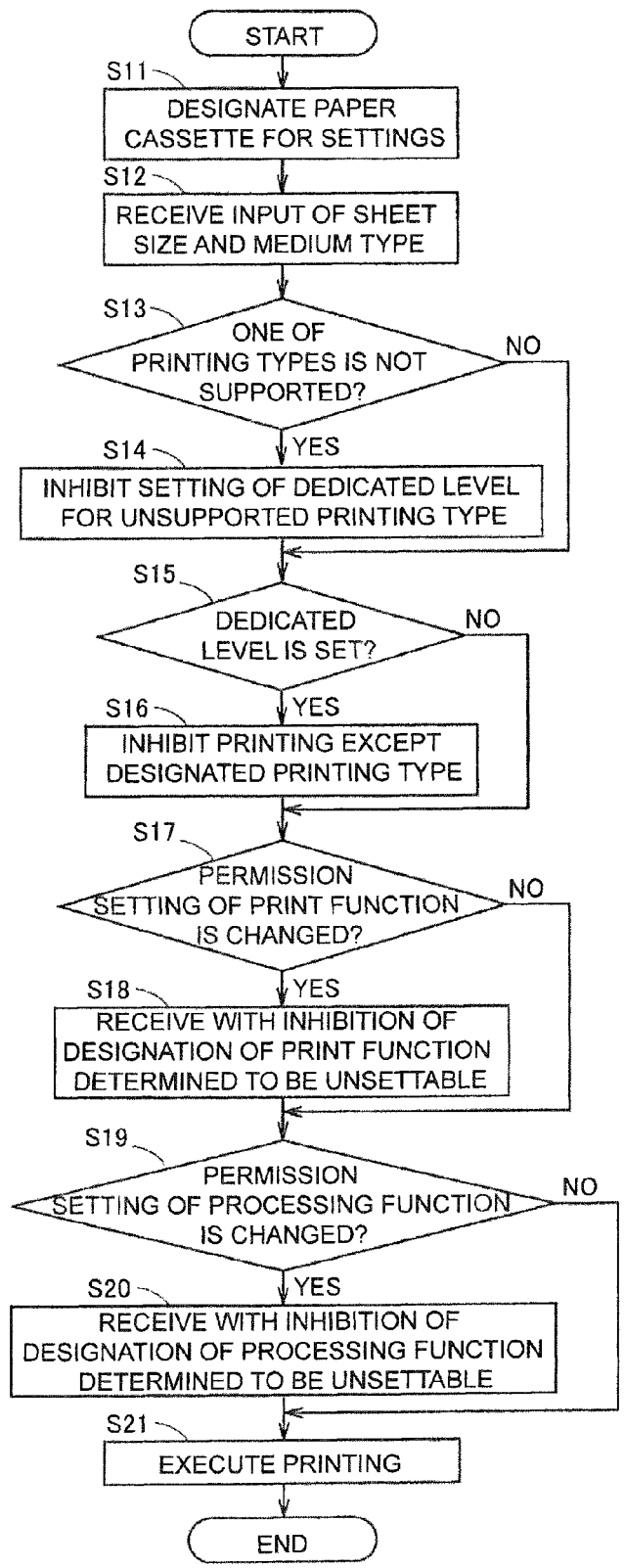
FIG. 5 is a flowchart showing process steps in a case where various settings are made for a paper cassette.

FIG. 5 is a flowchart showing process steps in a case where various settings are made for the first paper cassette 23a. First, referring to FIG. 5, in the digital multifunctional peripheral 11, a user designates, on the display screen 21 of the operation unit 13, one of the first through third paper cassettes 23a to 23c and the manual feed tray 28 in the paper loading unit 19 as a paper cassette on which paper is to be loaded and for which various settings are to be made (step S11 in FIG. 5, where the term "step" will be omitted hereinafter).

Figure 6:
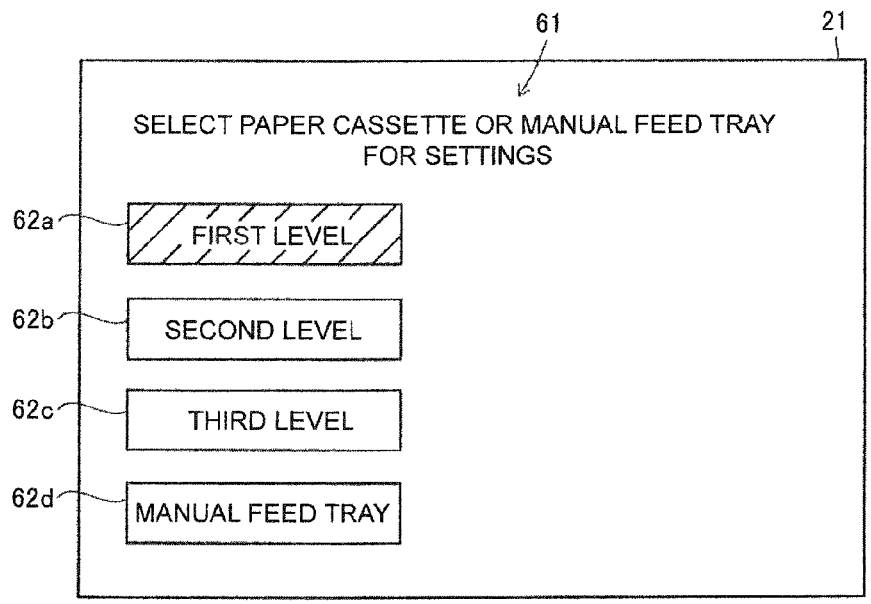
FIG. 6 illustrates an example of a display screen of the operation unit in designating a paper cassette.

FIG. 6 illustrates an example of the display screen 21 of the operation unit 13 in designating one of the first through third paper cassettes 23a to 23c and the manual feed tray 28. Referring to FIG. 6, the display screen 21 displays a message 61 of "SELECT PAPER CASSETTE OR MANUAL FEED TRAY FOR SETTINGS," a selection key 62a indicating "FIRST LEVEL" for designating the first paper cassette 23a at the first (uppermost) level, a selection key 62b indicating "SECOND LEVEL" for designating the second paper cassette 23b at the second level from the top, a selection key 62c indicating "THIRD LEVEL" for designating the third paper cassette 23c at the lowest level, and a selection key 62d indicating "MANUAL FEED TRAY" for designating the manual feed tray 28.

In this example, the user designates the first paper cassette 23a at the uppermost "FIRST LEVEL" among the three paper cassettes 23a to 23c and the manual feed tray 28. In this case, the user depresses the selection key 62a. Then, the digital multifunctional peripheral 11 detects the depression of the selection key 62a to recognize that the first paper cassette 23a at the "FIRST LEVEL" is specified as a paper cassette for settings. In FIG. 6, a portion where the selection key 62a is depressed is hatched.

When the digital multifunctional peripheral 11 receives the designation of the first paper cassette 23a for settings, the digital multifunctional peripheral 11 then receives the sheet size and the medium type of paper to be loaded on the first paper cassette 23a on the display screen 21 of the operation unit 13 (S12). Here, the operation unit 13, for example, operates as an input unit.

Figure 7:
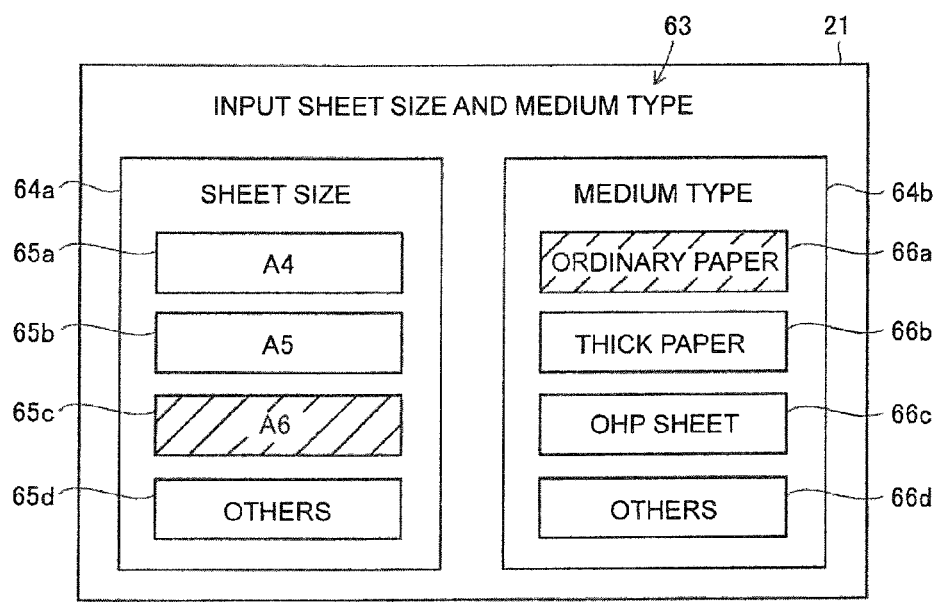
FIG. 7 is an example of the display screen of the operation unit in inputting a sheet size and a medium type.

FIG. 7 illustrates an example of the display screen 21 of the operation unit 13 in the case of inputting a sheet size and a medium type. Referring to FIG. 7, the display screen 21 displays a message 63 of "INPUT SHEET SIZE AND MEDIUM TYPE," a window 64a in which a sheet size is input, a selection key 65a indicating "A4" for inputting A4 size as a sheet size, a selection key 65b indicating "A5" for inputting A5 size as a sheet size, a selection key 65c indicating "A6" for inputting A6 size as a sheet size, and a selection key 65d indicating "OTHERS" for inputting sizes except A4, A5, and A6 sizes as a sheet size. The selection keys 65a to 65d are displayed within a frame enclosed by the window 64a. The display screen 21 also displays a window 64b in which a medium type is input, a selection key 66a indicating "ORDINARY PAPER" for inputting ordinary paper as a medium type, a selection key 66b indicating "THICK PAPER" as a medium type, a selection key 66c indicating "OVERHEAD PROJECTOR (OHP) SHEET" as a medium type, and a selection key 66d indicating "OTHERS" for inputting medium types except ordinary paper, thick paper, and OHP sheet as a medium type. The selection keys 66a to 66d are displayed within a frame enclosed by the window 64b.

In this example, the user depresses the selection key 65c in order to input A6 size as a sheet size. The user also depresses the selection key 66a in order to input ordinary paper as a medium type. The digital multifunctional peripheral 11 detects the depression of the selection keys 65c and 66a to recognize that data of A6 size is input as a sheet size and data of ordinary paper is input as a medium type. In FIG. 7, portions where the selection keys 65c and 66a are depressed are hatched.

Thereafter, with regard to the input sheet size and medium type, it is determined whether the digital multifunctional peripheral 11 includes an unsupported print type or not (S13). Specifically, based in the input data, it is determined whether one of the plurality of print types included in the digital multifunctional peripheral 11 is settable to a sheet loaded on the first paper cassette 23a. Here, the controller 12 operates as a first determination unit.

The digital multifunctional peripheral 11 provides copy printing, printer printing, and facsimile printing, as print types. However, if A6-size paper is not supported as paper for printing in facsimile reception in terms of a print type of the digital multifunctional peripheral 11, it is determined that facsimile printing is not supported as a print type for the first paper cassette 23a on which A6-size paper is loaded (S14).

Then, it is determined whether the first paper cassette 23a is set as a dedicated level or not (S15). The dedicated level refers to a level of a cassette for which paper loaded on one of the first through third paper cassettes 23a to 23c and the manual feed tray 28 is exclusively used for one print type. In this case, the digital multifunctional peripheral 11 receives settings for only one print type. The digital multifunctional peripheral 11 determines whether or not setting for exclusively using paper loaded on the first paper cassette 23a is made in accordance with the print type.

Figure 8:
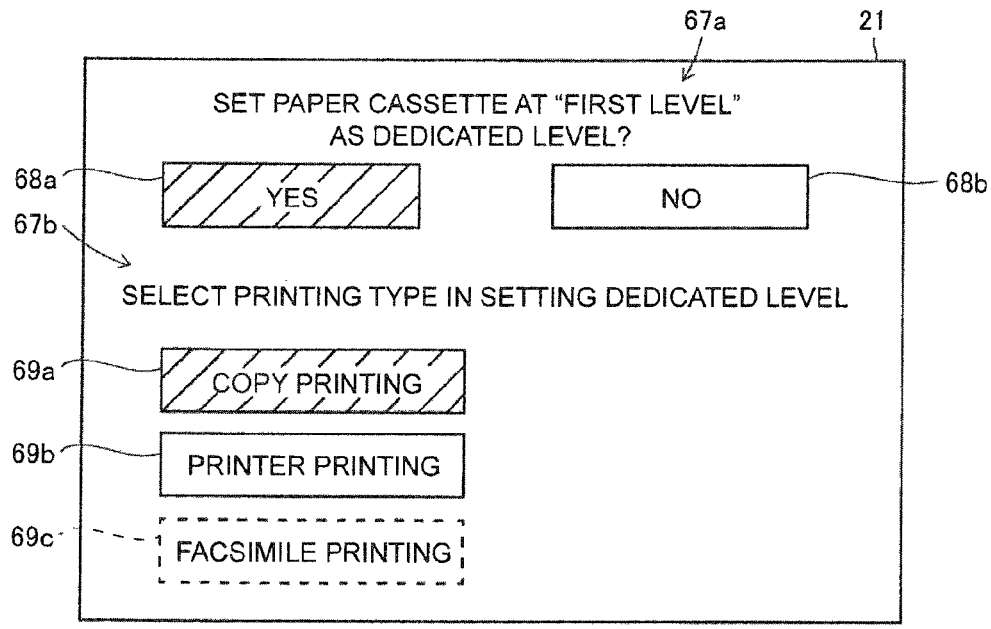
FIG. 8 illustrates an example of the display screen of the operation unit in setting a dedicated level.

FIG. 8 illustrates an example of the display screen 21 of the operation unit 13 in the case of setting a dedicated level. Referring to FIG. 8, the display screen 21 displays, in an upper region thereof, a message 67a for inquiring "SET PAPER CASSETTE AT "FIRST LEVEL" AS DEDICATED LEVEL?," a selection key 68a indicating "YES" for setting the first paper cassette 23a as the dedicated level, and a selection key 68b indicating "NO" for not setting the first paper cassette 23a as the dedicated level. The display screen 21 also displays, in a lower region thereof, a message 67b of "SELECT PRINTING TYPE IN SETTING DEDICATED LEVEL," a selection key 69a indicating "COPY PRINTING" that is depressed in the case of selecting copy printing as a print type for the dedicated level, a selection key 69b indicating "PRINTER PRINTING" that is depressed in the case of selecting printer printing as a print type for the dedicated level, and a selection key 69c indicating "FACSIMILE PRINTING" that is depressed in the case of selecting facsimile printing as a print type for the dedicated level.

The first paper cassette 23a at the first level that accommodates A6-size paper has a configuration for which the dedicated level for exclusively printing an image received by facsimile is unsettable. Thus, the selection key 69c for setting printing of an image received by facsimile is merely displayed, and cannot be selected by depression. In this case, in FIG. 8, the state of the merely displayed selection key 69c is indicated by a broken line. Specifically, on the display screen 21 of the operation unit 13, print types determined to be settable by the first determination unit, i.e., copy printing and printer printing in this example, are received, and a print type determined to be unsettable by the first determination unit, i.e., facsimile printing in this example, is inhibited. The display screen of the operation unit 13 receives setting of only one print type, i.e., setting of the dedicated level. Here, the operation unit 13, for example, operates as a first receiving unit.

Subsequently, the user depresses the selection key 68a to select setting of the first paper cassette 23a as the dedicated level, sets the first paper cassette 23a as the dedicated level to copy printing, and depresses the selection key 69a (YES in S15). In FIG. 8, portions where the selection keys 68a and 69a are depressed are hatched.

Then, the digital multifunctional peripheral 11 inhibits print types except copy printing for the first paper cassette 23a (S16). That is, in printing using the first paper cassette 23a, when a print type except copy printing is requested, the display screen 21 displays a warning or the like so as to inhibit printing.

Thereafter, it is determined whether a permission setting of a print function is changed or not for each of a plurality of print functions of the digital multifunctional peripheral 11 (S17). That is, based on input data, it is determined whether one of the print functions is settable for paper loaded on the first paper cassette 23a. Here, the controller 12 operates as a second determination unit.

Figure 9:
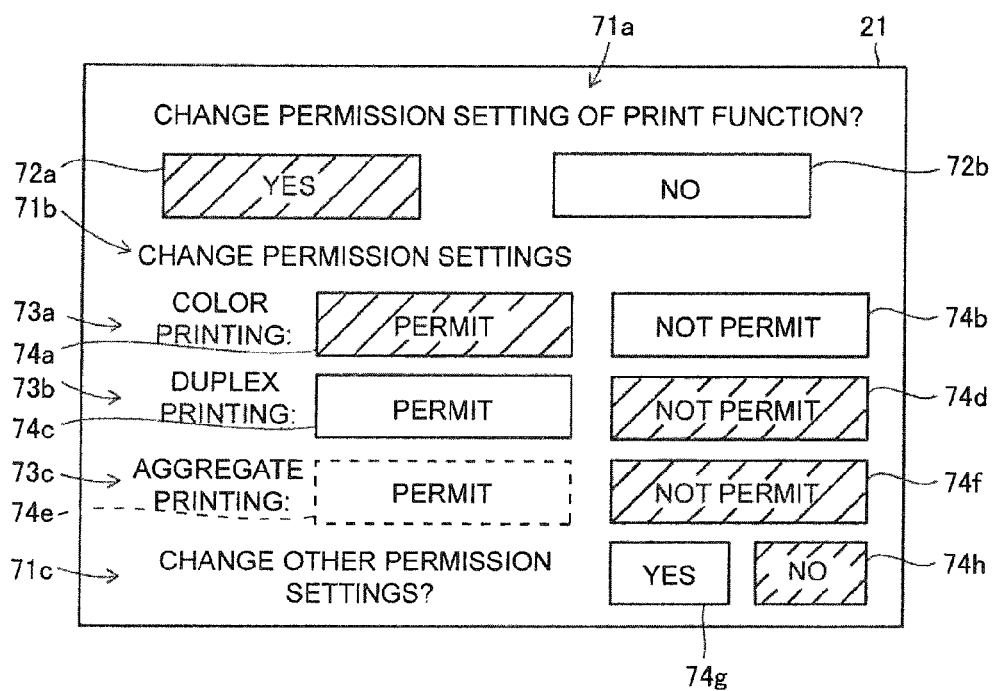
FIG. 9 illustrates an example of the display screen of the operation unit in changing permission settings of print functions.

FIG. 9 illustrates an example of the display screen 21 of the operation unit 13 in the case of changing permission settings of print functions. Referring to FIG. 9, the display screen 21 displays, in an upper region thereof, a message 71a of inquiring "CHANGE PERMISSION SETTING OF PRINT FUNCTION?," a selection key 72a indicating "YES" for changing permission settings of print functions, and a selection key 72b indicating "NO" for changing the permission settings of the print functions. The display screen 21 also displays, in a lower region thereof, a message 71b of "CHANGING PERMISSION SETTINGS," a designation 73a of "COLOR PRINTING" as a print function, a selection key 74a indicating "PERMIT" for permitting color printing, a selection key 74b indicating "NOT PERMIT" for inhibiting color printing, a designation 73b of "DUPLEX PRINTING" as a print function, a selection key 74c indicating "PERMIT" of permitting duplex printing, a selection key 74d indicating "NOT PERMIT" for inhibiting duplex printing, a designation 73c of "AGGREGATE PRINTING" as a print function, a selection key 74e indicating "PERMIT" for permitting aggregate printing, a selection key 74f indicating "NOT PERMIT" for inhibiting aggregate printing, a message 71c of inquiring "CHANGE OTHER PERMISSION SETTINGS?" for prompting the user to select other print functions, a selection key 74g indicating "YES" for changing other permission settings, and a selection key 74h indicating "NO" of not changing other permission settings.

In the digital multifunctional peripheral 11, if aggregate printing as a print function is unsettable for the first paper cassette 23a at the first level that accommodates A6-size paper, the selection key 74e for permitting aggregate printing in permission settings is merely displayed. Specifically, the selection key 74e cannot be selected by depression, and the selection key 74f has been already depressed. In this case, in FIG. 9, the merely displayed selection key 74e is indicated by a broken line. In FIG. 9, the already selected selection key 74f is hatched. Specifically, on the display screen 21 of the operation unit 13, settings of print functions determined to be settable by the second determination unit, i.e., permission or inhibition of color printing and permission or inhibition of duplex printing in this example, are received, and setting of a print function determined to be unsettable by the second determination unit, i.e., permission or inhibition of aggregate printing in this example, is inhibited. Here, the operation unit 13, for example, operates as a second receiving unit. Whether to change other permission settings or not is entered by depressing the selection key 74g or the selection key 74h.

Thereafter, the user depresses the selection key 74a for permitting color printing for the first paper cassette 23a. Since paper loaded on the first paper cassette 23a is backing paper, the user depresses the selection key 74f for inhibiting duplex printing for the first paper cassette 23a. After having detected the depression of the selection keys 74a and 74d, the digital multifunctional peripheral 11 permits color printing and inhibits duplex printing and aggregate printing, for printing in the first paper cassette 23a at the first level (S18). In FIG. 9, portions where the selection keys 72a, 73a, 74d, and 74h are depressed are hatched.

Subsequently, for the post-processing device 41 connected to the digital multifunctional peripheral 11, based on input data, it is determined whether one of the processing functions is settable to paper loaded on the first paper cassette 23a (S19). That is, in printing in the digital multifunctional peripheral 11, it is determined whether permission settings of processing functions in the connected post-processing device 41 are changed or not. Here, the controller 12 operates as a third determination unit.

Figure 10:
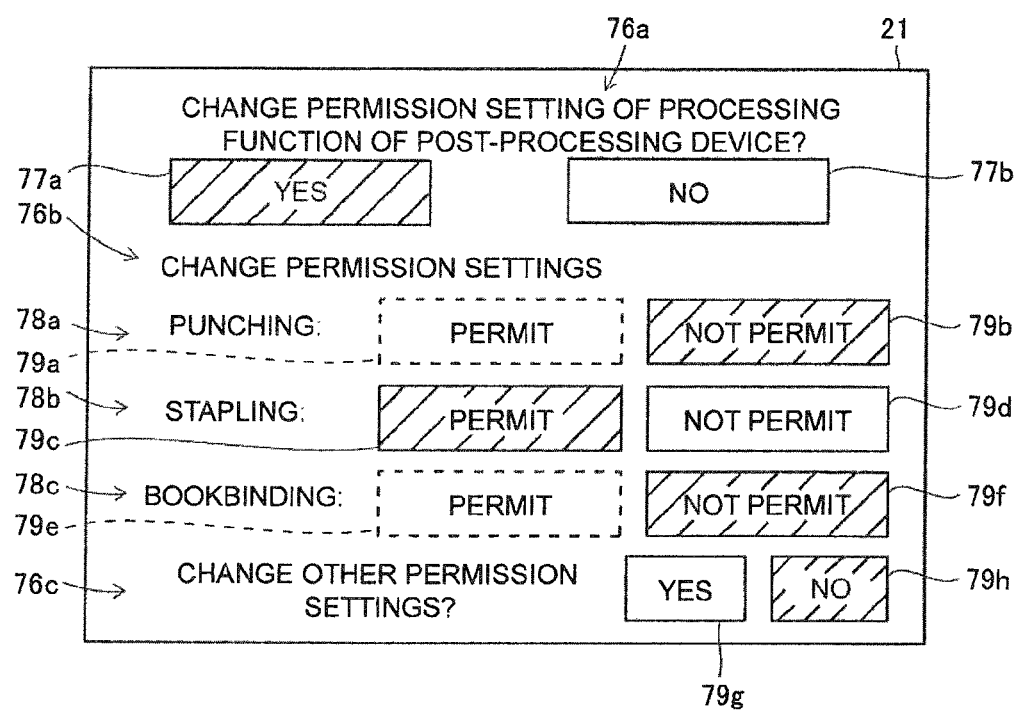
FIG. 10 illustrates an example of the display screen of the operation unit in the case of changing permission settings of processing functions of a post-processing device.

FIG. 10 illustrates an example of the display screen 21 of the operation unit 13 in the case of changing permission settings of processing functions of the post-processing device 41. Referring to FIG. 10, the display screen 21 displays, in an upper region thereof, a message 76a of inquiring "CHANGE PERMISSION SETTING OF PROCESSING FUNCTION OF POST-PROCESSING DEVICE?," a selection key 77a indicating "YES" for changing permission settings of processing functions of the post-processing device, and a selection key 77b indicating "NO" for not changing the permission settings of the processing functions of the post-processing device. The display screen 21 also displays, in a lower region thereof, a message 76b of "CHANGING PERMISSION SETTINGS," a designation 78a of "PUNCHING" as a processing function of the post-processing device 41, a selection key 79a indicating "PERMIT" for permitting punching by the punching mechanism 42, a selection key 79b indicating "NOT PERMIT" for inhibiting punching by the punching mechanism 42, a designation 78b of "STAPLING" as a processing function of the post-processing device 41, a selection key 79c indicating "PERMIT" for permitting stapling by the stapling mechanism 43, a selection key 79d indicating "NOT PERMIT" for inhibiting stapling by the stapling mechanism 43, a designation 78c of "BOOKBINDING" as a processing function of the post-processing device 41, a selection key 79e indicating "PERMIT" for permitting bookbinding by the bookbinding mechanism 44, a selection key 79f indicating "NOT PERMIT" for inhibiting bookbinding by the bookbinding mechanism 44, a message 76c of inquiring "CHANGE OTHER PERMISSION SETTINGS?" for prompting the user to select other processing functions of the post-processing device, a selection key 79g indicating "YES" for changing other permission settings, and a selection key 79h indicating "NO" for not changing other permission settings.

For the first paper cassette 23a at the first level that accommodates A6-size paper in the digital multifunctional peripheral 11, if punching by the punching mechanism 42 and bookbinding by the bookbinding mechanism 44 as processing functions of the post-processing device 41 are unsettable, the selection key 79a for permitting punching and the selection key 79e for permitting bookbinding in permission settings are merely displayed. Specifically, the selection key 79a and the selection key 79e cannot be selected by depression. In FIG. 10, the selection keys 79a and 79e that are merely displayed are indicated by broken lines. In FIG. 10, portions corresponding to the already selected selection keys 79b and 79f are hatched. Specifically, on the display screen 21 of the operation unit 13, setting of a processing function determined to be settable by the third determination unit, i.e., permission or inhibition of stapling in this example, is received, and settings of processing functions determined to be unsettable by the third determination unit, i.e., permission or inhibition of punching and permission or inhibition of bookbinding in this example, are inhibited. Here, the operation unit 13, for example, operates as a third receiving unit. Whether to change other permission settings or not is entered by depressing the selection key 79g or the selection key 79h.

Subsequently, the user depresses the selection key 79c for permitting stapling for the first paper cassette 23a. After having detected the depression of the selection key 79c, the digital multifunctional peripheral 11 permits stapling for printing using the first paper cassette 23a and inhibits punching and bookbinding (S20). In FIG. 10, portions where the selection keys 77a, 79c, and 79h are depressed are hatched.

After all the settings have been finished, printing is executed (S21). In this case, based on the settings described above, paper loaded on the first paper cassette 23a is used, and an image of an A6-size document read by the image reading unit 14 using the ADF 22 is formed by the image forming unit 15, thereby performing printing.

If "NO" is selected in each of S13, S15, S17, and S19, neither designation nor setting is performed, and the process proceeds to next step, i.e., S14, S16, S18, and S20, respectively.

In the digital multifunctional peripheral 11 described above, the image forming unit 15 performs printing on paper loaded on the first paper cassette 23a in accordance with data input by the input unit, settings for individual print types received by the first receiving unit, and settings of print functions received by the second receiving unit. In this case, based on data input by the input unit, the first determination unit inhibits settings of print types that are unsettable for the first paper cassette 23a and receives settings of settable print types. Thus, unsettable print types are not entered. In addition, based on the data input by the input unit, the second determination unit inhibits settings of print functions that are unsettable for the first paper cassette 23a, and receives settings of settable print function. Thus, unsettable print functions are not entered. The image forming unit 15 performs printing of an image on paper loaded on the first paper cassette 23a in accordance with the data input by the input unit, a print type received by the first receiving unit, and setting of a print function received by the second receiving unit. Thus, printing can be performed by using paper loaded on the first paper cassette 23a as intended by the user. As a result, the digital multifunctional peripheral 11 can reduce the possibility of printing errors and perform printing as intended by the user.

In this case, the post-processing device 41 having a plurality of post-processing functions to be performed on paper loaded on the first paper cassette 23a is connected to the digital multifunctional peripheral 11. The digital multifunctional peripheral 11 includes: the third determination unit that determines whether one of the processing functions is settable to paper loaded on the first paper cassette 23a or not, based on data input by the input unit; and the third receiving unit that receives setting of a post-processing function determined to be settable by the third determination unit and inhibits setting of a processing function determined to be unsettable by the third determination unit. The controller 12 controls the image forming unit 15 to perform printing of an image on paper loaded on the first paper cassette 23a, in accordance with setting of the processing function received by the third receiving unit. Thus, even in the case of printing using the post-processing functions of the post-processing device 41, the possibility of printing errors can be reduced, and printing can be performed as intended by the user. That is, duplex printing is not performed by designating the first paper cassette 23a loaded with backing paper, and unnecessary duplex printing is not performed. In addition, it is possible to avoid consuming, in printer printing, A6-size backing ordinary paper loaded on the first paper cassette 23a at the dedicated level for copy printing.

In the embodiment described above, settings of the first paper cassette 23a have been described. However, the present disclosure is not limited to this example, and the other second and third paper cassettes 23b and 23c and the manual feed tray 28 may be similarly set. That is, settings of the second and third paper cassettes 23b and 23c and the manual feed tray 28 may be designated on the selecting screen illustrated in FIG. 6.

In the embodiment described above, the second determination unit determines whether one of the plurality of print functions is settable or not to paper loaded on the paper loading unit, based on data input by the input unit. However, the present disclosure is not limited to this example, and the second determination unit may determine whether one of the plurality of print functions is settable to paper loaded on the paper loading unit, based on data input by the input unit and settings for a print type received by the first receiving unit.

In the embodiment described above, the third determination unit determines whether one of the plurality of processing functions is settable to paper loaded on the paper loading unit, based on data input by the input unit. However, the present disclosure is not limited to this example, and the third determination unit may determine whether one of the plurality of processing functions is settable to paper loaded on the paper loading unit, based on data input by the input unit, setting of a print type received by the first receiving unit, and setting of a print function received by the second receiving unit.

In the embodiment described above, the print types are copy printing, printer printing, and facsimile printing. Alternatively, the print types may include at least one of copy printing, printer printing, and facsimile printing.

In the embodiment described above, the dedicated level is designated. However, the present disclosure is not limited to this example, and a plurality of print types may be performed for one paper loading unit.

In the embodiment described above, the printer includes all the components. However, the present disclosure is not limited to this example, and the printer system may include all the components. Specifically, a printer system according to an embodiment of the present disclosure includes a printer providing a plurality of print types and having a plurality of print functions and a computer connected to the printer and capable of requesting printing to the printer. The printer includes a printing unit for printing an image on paper and a paper loading unit for loading paper on which an image is to be printed by the printing unit. One of the printer and the computer includes: an input unit configured to input at least one of data on a sheet size or data on a medium type of the paper sheet loaded on the paper loading unit; a first determination unit configured to determine whether one of the plurality of print types is settable or not to the paper sheet loaded on the paper loading unit, based on the data input by the input unit; a first receiving unit configured to receive a setting of at least one of the print types determined to be settable by the first determination unit and inhibit a setting of at least one of the print types determined to be unsettable by the first determination unit; a second determination unit configured to determine whether one of the plurality of print functions is settable or not to the paper sheet loaded on the paper loading unit, based on the data input by the input unit; a second receiving unit configured to receive a setting of at least one of the print functions determined to be settable by the second determination unit and inhibit a setting of at least one of the print functions determined to be unsettable by the second determination unit; and a controller configured to perform printing of an image by the printing unit on the paper sheet loaded on the paper loading unit, in accordance with the data input by the input unit, the print type received by the first receiving unit, and the setting of the print function received by the second receiving unit. Such a configuration may be employed.

Then, in a digital multifunctional peripheral 11 according to another embodiment of the present disclosure, the case of loading A5-size ordinary paper on a first paper cassette 23a will be described. In this case, a user as an operator of a printer uses the digital multifunctional peripheral 11 and loads A5-size ordinary paper on the first paper cassette 23a located at the uppermost level among first through third paper cassettes 23a to 23c. In this embodiment, A5 size is selected as a sheet size, and ordinary paper is selected as a medium type for the first paper cassette 23a. The digital multifunctional peripheral 11 can perform punching but cannot perform stapling on A5-size paper.

Figure 11:
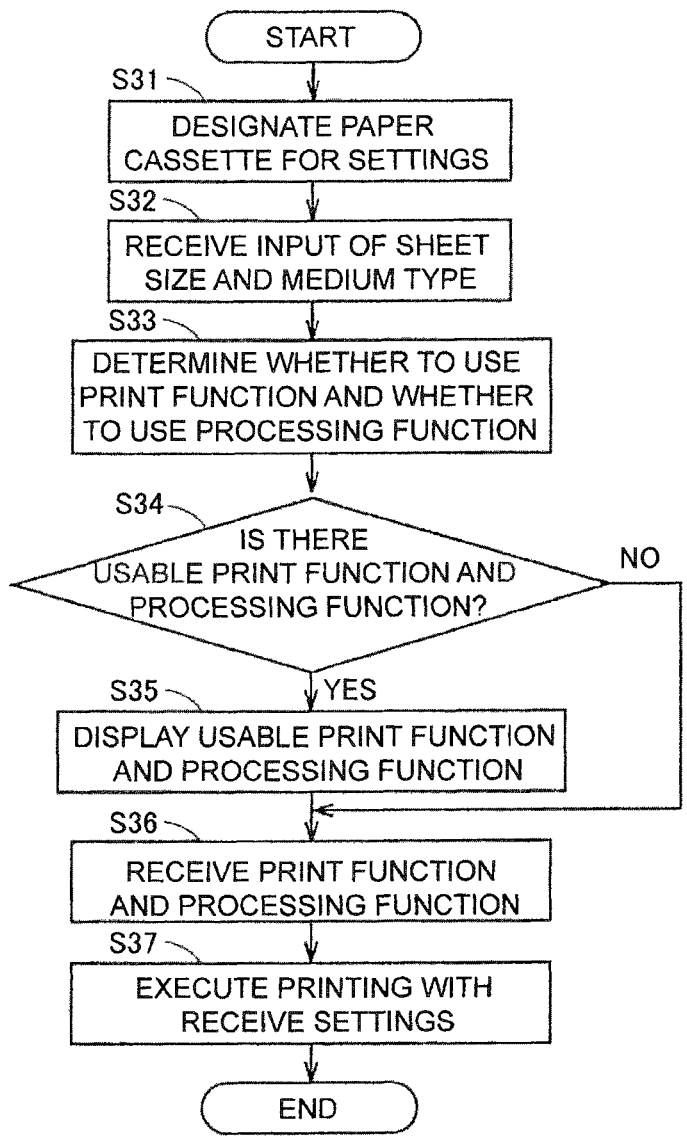
FIG. 11 is a flowchart showing process steps in a case where various settings are made for a paper cassette

FIG. 11 is a flowchart showing process steps in a case where various settings are made for the first paper cassette 23a. First, referring to FIG. 11, in the digital multifunctional peripheral 11, a user designates, on a display screen 21 of an operation unit 13, one of the first through third paper cassettes 23a to 23c and a manual feed tray 28 in a paper loading unit 19 as a paper cassette on which paper is to be loaded and for which various setting are to be made (S31). Here, the first paper cassette 23a located at the uppermost level is designated.

Figure 12:
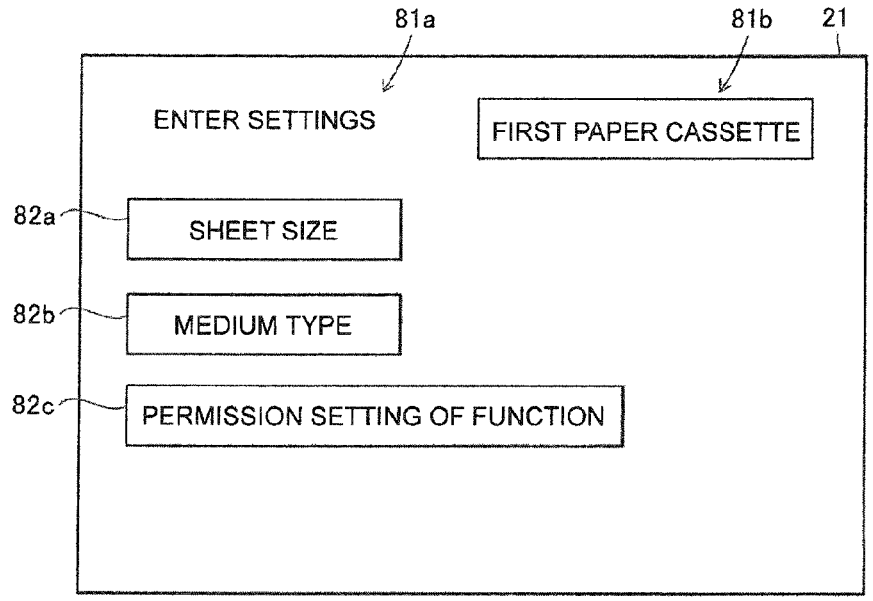
FIG. 12 illustrates an example of the display screen of the operation unit in setting a sheet size and a medium type of paper, for example.

Next, settings of, for example, the sheet size and the medium type are performed on paper loaded on the first paper cassette 23a. FIG. 12 illustrates an example of the display screen 21 of the operation unit 13 in setting the sheet size and medium type of paper, for example. Referring to FIG. 12, the display screen 21 displays a message 81a of "ENTER SETTINGS," a designation 81b of "FIRST PAPER CASSETTE" for notifying the user that the level to be set is the first paper cassette 23a, a selection key 82a indicating "SHEET SIZE" for shifting to a display screen 21 on which a sheet size is entered by depression, a selection key 82b indicating "SHEET MEDIUM TYPE" for shifting to a display screen 21 on which a sheet medium type is entered by depression, and a selection key 82c indicating "PERMISSION SETTING OF FUNCTION" for shifting to a display screen 21 on which permission setting of a function is entered by depression.

Here, the user inputs a sheet size and a medium type of paper. Specifically, the user depresses the selection key 82a so that the screen shifts to a display screen 21 on which a sheet size is entered. Then, A5-size is selected as a sheet size of paper to be loaded on the first paper cassette 23a, and is entered. The user depresses the selection key 82b so that the screen shifts to a display screen 21 on which a medium type of paper is entered. Then, ordinary paper is selected as a medium type of paper loaded on the first paper cassette 23a, and the selected medium type is entered. The controller 12 receives the input sheet size and medium type (S32).

Thereafter, based on the input sheet size and medium type, the controller 12 determines usable functions and unusable functions from among the print functions of the digital multifunctional peripheral 11. Here, the controller 12 operates as a first determination unit. Based on the input sheet size and medium type, the controller 12 determines usable processing functions and unusable processing functions in a post-processing device 41 included in the digital multifunctional peripheral 11 (S33). Here, the controller 12 operates as a second determination unit.

After the determinations by the first determination unit and the second determination unit, if there is a usable print function and a usable processing function of the post-processing device 41 (YES in S34), these functions are displayed on the display screen 21 (S35).

Figure 13:
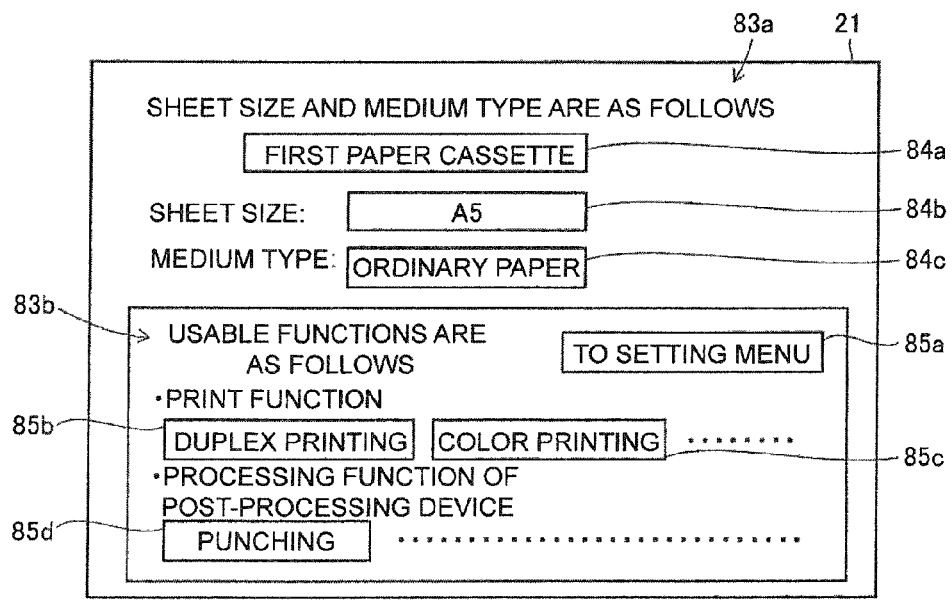
FIG. 13 illustrates an example of the display screen of the operation unit in performing permission settings of functions.

At this time, the user depresses the selection key 82c and performs permission settings of the functions. Specifically, permission settings of print functions and permission settings of processing functions of the post-processing device 41 are performed. FIG. 13 illustrates an example of the display screen 21 of the operation unit 13 in the case of performing permission settings of functions. Referring to FIG. 13, the display screen 21 displays a message 83a of "SHEET SIZE AND MEDIUM TYPE ARE AS FOLLOWS," a designation 84a of "FIRST PAPER CASSETTE" indicating a designated paper cassette, designation 84b of "A5" designated as a sheet size, a designation 84c of "ORDINARY PAPER" specified as a medium type, a message 83b of "USABLE FUNCTIONS ARE AS FOLLOWS," a selection key 85a indicating "TO SETTING MENU" for shifting to a function setting screen, a designation 85b for "DUPLEX PRINTING" as a usable print function, a designation 85c of "COLOR PRINTING" also as a usable print function, and a designation 85d of "PUNCHING" as a usable processing function of the post-processing device 41. "STAPLING" that is unusable as a processing function of the post-processing device 41 is not displayed. Other usable print functions and processing functions of the post-processing device 41 are not shown.

Thereafter, the user confirms usable functions on the display screen 21, and then sets a print function and a processing function. Specifically, the user depresses the selection key 85a indicating "TO SETTING MENU." When detecting the depression of the selection key 85a, the controller 12 shifts the screen to the display screen 21 illustrated in FIG. 14.

Figure 14:
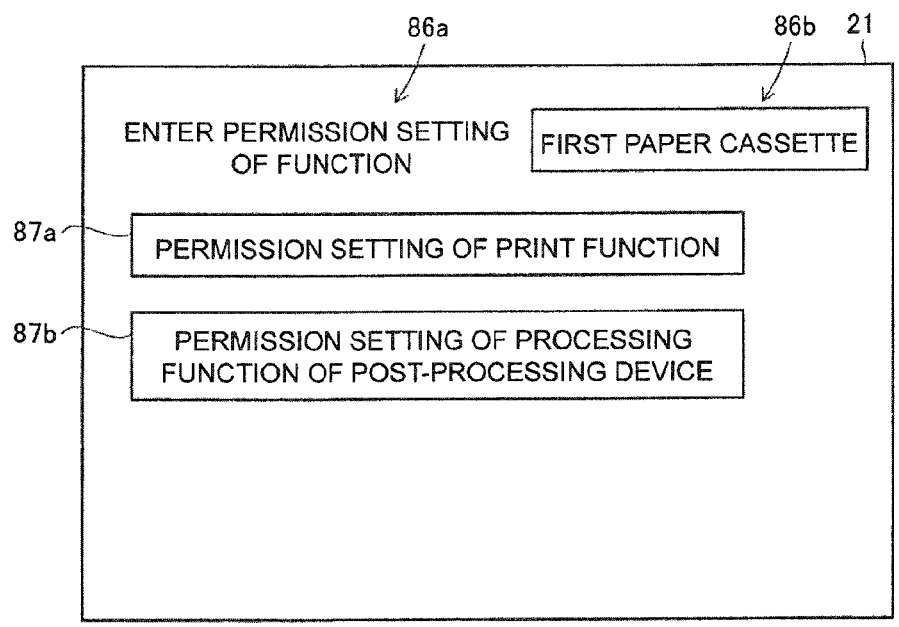
FIG. 14 illustrates an example of the display screen of the operation unit in performing permission settings of print functions.

FIG. 14 illustrates an example of the display screen 21 of the operation unit 13 in the case of performing permission settings of functions. Referring to FIG. 14, the display screen 21 displays a message 86a of "ENTER PERMISSION SETTING OF FUNCTION," a designation 86b of "FIRST PAPER CASSETTE" for notifying the user that the level to be set is the first paper cassette 23a, a selection key 87a indicating "PERMISSION SETTING OF PRINT FUNCTION," and a selection key 87b indicating "PERMISSION SETTING OF PROCESSING FUNCTION OF POST-PROCESSING DEVICE." The user depresses the selection key 87a so that the screen shifts to a display screen 21 on which permission settings of print functions are entered, and then enters permission settings of print functions. Specifically, after having depressed the selection key 87a, the user sets whether to permit duplex printing or not and whether to permit color printing or not, fir paper loaded on the first paper cassette 23a.

The use also depresses the selection key 87b so that the screen shifts to a display screen 21 on which permission settings of processing functions of the post-processing device 41 are entered, and then enters permission settings of processing functions of the post-processing device 41.

Figure 15:
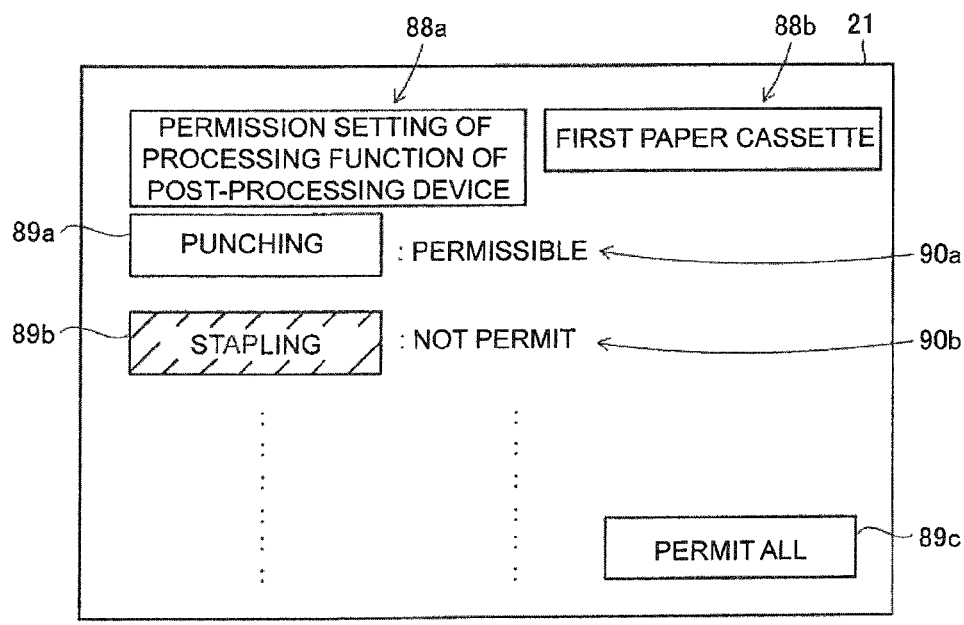
FIG. 15 illustrates an example of the display screen of the operation unit in the case of performing permission settings of processing functions of a post-processing device.

FIG. 15 illustrates an example of the display screen 21 of the operation unit 13 in the case of entering permission settings of processing functions of the post-processing device 41. Referring to FIG. 15, the display screen 21 displays a message 88a of "PERMISSION SETTING OF PROCESSING FUNCTION OF POST-PROCESSING DEVICE," a designation 88b of "FIRST PAPER CASSETTE" for notifying the user that the level to be set is the first paper cassette 23a, a selection key 89a indicating "PUNCHING" for processing by a punching function using the punching mechanism 42 as a processing function of the post-processing device 41, a designation 90a of "PERMISSIBLE" located next to the selection key 89a and indicating that "PUNCHING" can be entered based on the input sheet size and medium type, a selection key 89b indicating "STAPLING" for processing by a stapling function using the stapling mechanism 43 as a processing function of the post-processing device 41, a designation 90b of "NOT PERMIT" located next to the selection key 89b and indicating that "STAPLING" cannot be entered based on the input sheet size and medium type, and a selection key 89c indicating "PERMIT ALL" for selecting all the permissible processing functions.

The display of stapling in the selection key 89b is grayed out because stapling is not permitted, i.e., cannot be entered. Thus, even when the selection key 89b is depressed, no change occurs and settings cannot be changed. The gray-out display is indicated by hatching in FIG. 15.

Here, to perform a permission setting of the punching function, the user depresses the selection key 89a. After having detected the depression of the selection key 89a, the controller 12 shifts the display screen 21 to that illustrated in FIG. 16.

Figure 16:
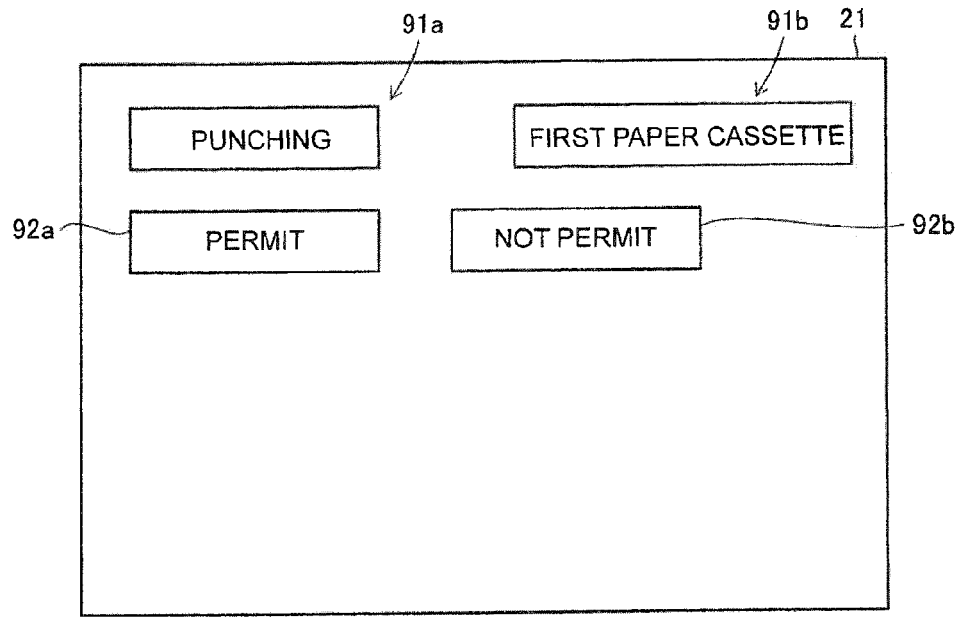
FIG. 16 illustrates an example of the display screen of the operation unit in the case of performing a permission setting of punching.

FIG. 16 illustrates an example of the display screen 21 of the operation unit 13 in the case of performing a permission setting of punching. Referring to FIG. 16, the display screen 21 displays a designation 91a of "PUNCHING" as a processing function to be set, a designation 91b of "FIRST PAPER CASSETTE" for notifying the user that the level to be set is the first paper cassette 23a, a selection key 92a indicating "PERMIT" for entering permission of punching, and a selection key 92b indicating "NOT PERMIT" for entering inhibition of punching. The user depresses one of the selection keys 92a and 92b so as to enter permission or inhibition of punching. In this manner, settings for the other processing functions are entered. Settings of the print functions described above are entered similarly. By depressing the selection key 89c, all the print functions and processing functions of the post-processing device 41 in permissible states are entered as being permitted. Thus, to enter all the print functions and processing functions of the post-processing device 41 in permissible states as being permitted, the permission can be more easily entered by using the selection key 89c.

In this manner, settings of print functions and settings of processing functions of the post-processing device 41 are received (S36). Then, in the received state, printing is carried out by using the print functions and the processing functions of the post-processing device 41 (S37).

In the digital multifunctional peripheral 11 described above, based on the input data on the sheet size and the medium type of paper, it is determined whether each of a plurality of print functions is settable to paper loaded on the first paper cassette 23a or not. Based on the input data on the sheet size and the medium type of paper, it is determined whether each of the processing functions of the post-processing device 41 is settable to paper loaded on the first paper cassette 23a or not. Then, the display screen 21 is controlled to display the determination results. In this manner, settable print functions and settable processing functions of the post-processing device 41 among a plurality of print functions and processing functions of the post-processing device 41 are displayed in accordance with the determination results so as to promote settings of print functions and processing functions of the post-processing device 41. In addition, unsettable print functions and unsettable processing functions of the post-processing device 41 are grayed out so as to avoid entry of the unsettable print functions and the unsettable processing functions of the post-processing device 41. Thus, the digital multifunctional peripheral 11 can reduce the possibility of printing errors due to an error in setting print functions and processing functions of the post-processing device 41.

In this case, unsettable print functions and unsettable processing functions of the post-processing device 41 are grayed out on the screen, the grayed-out print functions and the grayed-out processing functions of the post-processing device 41 are inhibited and cannot be entered, but the user can recognize these print functions and processing functions as print functions of the digital multifunctional peripheral 11 and processing functions of the post-processing device 41.

The digital multifunctional peripheral 11 may control the display screen 21 to display at least one of a determination result by the first determination unit and a determination result by the second determination unit in the plurality of paper cassettes of the paper loading unit 19. The display screen 21 may be controlled to display a preview of an image to be printed by the printing unit.

Figure 17:
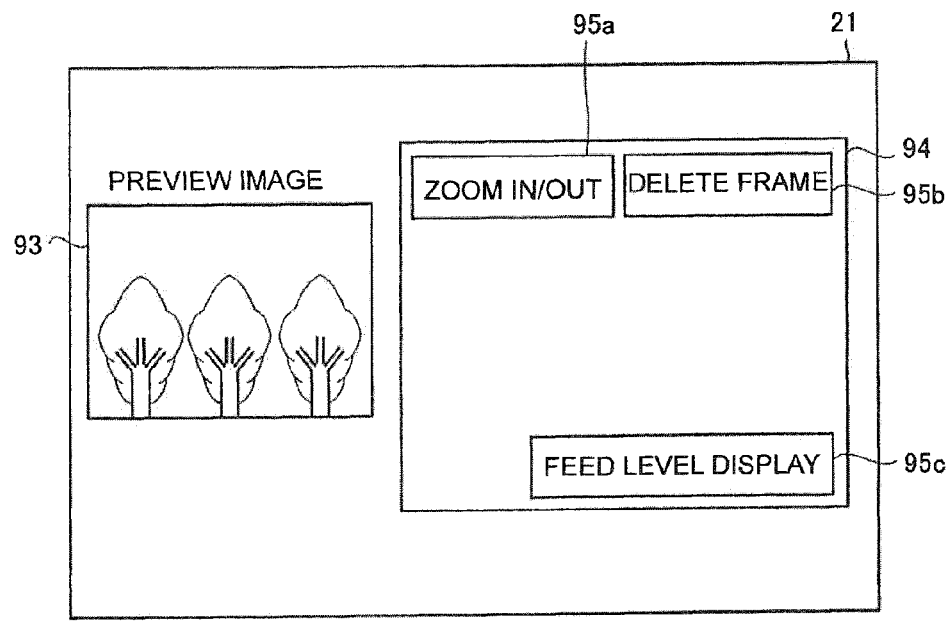
FIG. 17 illustrates another example of the display screen of the operation unit in the case of setting print functions.
Figure 18:
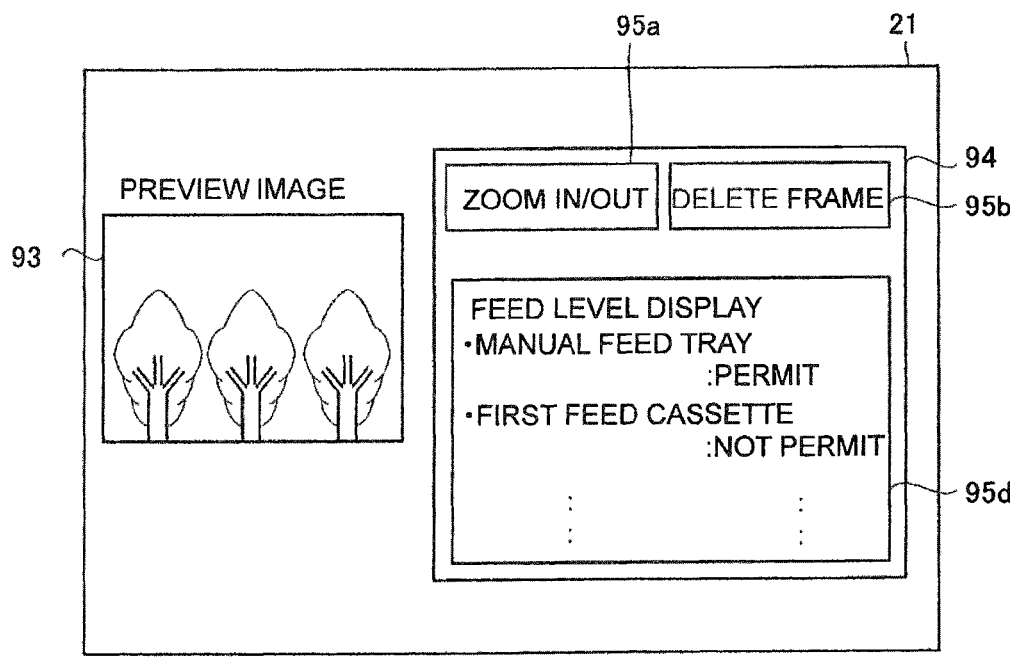
FIG. 18 illustrates the example of the display screen of the operation unit illustrated in FIG. 17 in the case of displaying a feed level for permission settings of print functions.

FIG. 17 illustrates another example of the display screen 21 of the operation unit 13 in the case of setting print functions. Referring to FIG. 17, the display screen 21 displays a preview image 93 for previewing an image to be printed by reading an image on a document by the image reading unit 14, a window 94 for displaying selection keys for entering print functions, a selection key 95a indicating "ZOOM IN/OUT" and used for entering zoom-in/out as a print function, a selection key 95b indicating "DELETE FRAME" and used for entering whether a frame is deleted or not as a print function, and a selection key 95c indicating "FEED LEVEL DISPLAY" and showing feed levels included in the digital multifunctional peripheral 11 and also showing whether printing can be performed or not with a selected print function for each feed level, when being depressed. FIG. 18 illustrates the example of the display screen 21 of the operation unit 13 illustrated in FIG. 17 in the case of entering print functions in the case of depressing the selection key 95c.

Referring to FIGS. 17 and 18, when the selection key 95a or the selection key 95b is depressed and the selection key 95c is depressed, the screen displays whether it is possible to enter settings for the feed levels, i.e., the manual feed tray 28 and the first through third paper cassettes 23a to 23c. Specifically, a designation 95d of "MANUAL FEED TRAY: PERMIT, FIRST PAPER CASSETTE: NOT PERMIT, . . . ." That is, feed levels to which print functions are determined to be settable and unsettable based on the input sheet size and medium type are displayed. With reference to the designation 95d, the user enters "ZOOM IN/OUT" and designates a feed level for printing, for example, while seeing the preview image 93. In this manner, the possibility of designating a feed level to which a selected print function is unsettable, thereby enhancing operability.

For example, in the case of inputting thick paper or overhead projector (OHP) sheet as a medium type, setting of permit or not permit is inhibited for duplex printing and stapling. That is, duplex printing and stapling cannot be selected as the medium types that can be neither printed nor processed, and "NOT PERMIT" is selected.

In the embodiment described above, settings for the first paper cassette 23a have been described. However, the present disclosure is not limited to this example, and settings can be made similarly for each of the second paper cassette 23b, the third paper cassette 23c, and the manual feed tray 28. That is, the second paper cassette 23b, the third paper cassette 23c, or the manual feed tray 28 is designated as a paper cassette for which settings are made.

In the embodiment described above, the second determination unit determines whether one of a plurality of processing functions can be selected for paper loaded on the paper loading unit based on data input by the input unit. However, the present disclosure is not limited to this example, and the second determination unit may be configured to determine whether one of a plurality of processing functions can be selected for paper loaded on the paper loading unit based on data input by the input unit and a designated print function.

In the embodiment described above, unsettable items are grayed out based on the sheet size and the medium type. However, the present disclosure is not limited to this example, and unsettable items, i.e., inhibited items, may not be displayed. In this manner, the display screen can be more simplified by displaying only settable functions.

In the embodiment described above, settings of a plurality of print functions may include at least one of a selection between monochrome printing and color printing and a selection between duplex printing and simplex printing.

In the embodiment described above, the plurality of processing functions may include at least one of a punching function of performing punching and a stapling function of performing stapling.

In the embodiment described above, the digital multifunctional peripheral includes the detachable post-processing device for performing post-processing on paper. However, the present disclosure is not limited to this example, and the post-processing device may not be included. The digital multifunctional peripheral may also include an intermediate processing device for performing intermediate processing on paper on which an image is being formed.

In the embodiment described above, both the sheet size and the medium type are input. However, the present disclosure is not limited to this example, and only one of the sheet size and the medium type may be input so that determination of whether setting for a print type is permitted or not or determination of whether a print function is settable or not is performed based on the input data.

In the embodiment described above, the digital multifunctional peripheral 11 includes all the components. However, the present disclosure is not limited to this example, and the printer system may include all the components. Specifically, the printer system of this embodiment of the present disclosure includes a printer having a plurality of print functions and a computer connected to the printer and capable of requesting printing to the printer. The printer includes a printing unit for printing an image on paper and a paper loading unit for loading paper on which an image is to be printed by the printing unit. One of the printer and the computer includes: a display unit configured to display data concerning printing; an input unit configured to input at least one of data on a sheet size or data on a medium type of the paper sheet loaded on the paper loading unit; a first determination unit configured to determine whether each of the print function is settable or not to the paper sheet loaded on the paper loading unit, based on the data input by the input unit; and a controller configured to control the display unit to display a determination result obtained by the first determination unit. Such a configuration may be employed. Specifically, the display unit may be a display device connected to the computer, and the input or depression may be a click using a mouse or an input from a keyboard.

It should be understood that the embodiments and examples disclosed herein are illustrative and non-restrictive in every respect. The scope of the present disclosure is defined by the terms of the claims, rather than by the foregoing description, and is intended to include any modifications within the scope and meaning equivalent to the terms of the claims.

The printer and the printer system according to the present disclosure are effectively used especially for cases where reduction of printing errors is required.

What is claimed is:

1. A printer providing a plurality of print types and having a plurality of print functions, the printer comprising:
    a display unit configured to display data concerning printing;
    a printing unit configured to print an image on a paper sheet;
    a paper loading unit configured to load the paper sheet on which an image is to be printed by the printing unit;
    an input unit configured to input at least one of data on a sheet size or data on a medium type of the paper sheet loaded on the paper loading unit;
    a first determination unit configured to determine whether one of the plurality of print types is settable or not to the paper sheet loaded on the paper loading unit, based on the data input by the input unit;
    a first receiving unit configured to receive a setting of at least one of the print types determined to be settable by the first determination unit and inhibit a setting of at least one of the print types determined to be unsettable by the first determination unit;
    a second determination unit configured to determine whether one of the plurality of print functions is settable or not to the paper sheet loaded on the paper loading unit, based on the data input by the input unit;
    a second receiving unit configured to receive a setting of at least one of the print functions determined to be settable by the second determination unit and inhibit a setting of at least one of the print functions determined to be unsettable by the second determination unit; and
    a controller configured to perform printing of an image by the printing unit on the paper sheet loaded on the paper loading unit, in accordance with the data input by the input unit, the print type received by the first receiving unit, and the setting of the print function received by the second receiving unit, wherein
        the controller controls the display unit so that the display unit displays a preview of an image to be printed by the printing unit, a selection key used for entering zoom-in/out as a print function when being depressed, and a selection key showing feed levels included in the printer as well as whether printing can be performed or not with a selected print function for each feed level when being depressed, and
        the controller controls the display unit so that the display unit displays feed levels for which print functions are determined to be settable and unsettable based on the input sheet size and medium type, when the controller detects the depression of the selection key used for entering zoom-in/out as a print function and the depression of the selection key showing feed levels included in the printer as well as whether printing can be performed or not with a selected print function for each feed level.

2. The printer according to claim 1, wherein
the second determination unit determines whether one of the plurality of print functions is settable to the paper sheet loaded on the paper loading unit, based on the data input by the input unit and the print type received by the first receiving unit.

3. The printer according to claim 1, further comprising:
a processing device having a plurality of processing functions to be performed on the paper sheet loaded on the paper loading unit;
a third determination unit configured to determine whether one of the plurality of processing functions is settable or not to the paper sheet loaded on the paper loading unit, based on the data input by the input unit; and
a third receiving unit configured to receive a setting of at least one of the processing functions determined to be settable by the third determination unit and a setting of at least one of the processing functions determined to be unsettable by the third determination unit, wherein
the controller controls the printing unit so that the printing unit prints an image on the paper sheet loaded on the paper loading unit in accordance with a setting of the processing function received by the third receiving unit.

4. The printer according to claim 3, wherein
the third determination unit determines whether one of the plurality of processing functions is settable or not to the paper sheet loaded on the paper unit, based on the data input by the input unit, the print type received by the first receiving unit, and the setting of the print function received by the second receiving unit.

5. The printer according to claim 1, wherein
the first receiving unit receives a setting of one of the print types.

6. The printer according to claim 1, wherein
the plurality of print types include at least one of copy printing, printer printing, and facsimile printing.

7. The printer according to claim 1, wherein
settings of the plurality of print functions include at least one of a selection between monochrome printing and color printing and a selection between duplex printing and simplex printing.

8. The printer according to claim 3, wherein
the plurality of processing functions include at least one of a punching function and a stapling function.

9. The printer according to claim 3, wherein
the paper loading unit comprises a plurality of paper loading units, and
the first through third receiving units are configured to perform settings for each of the paper loading units.

10. A printer system comprising:
a printer providing a plurality of print types and having a plurality of print functions; and
a computer connected to the printer and configured to request printing to the printer, wherein
the printer includes
   a display unit configured to display data concerning printing;
   a printing unit configured to print an image on a paper sheet, and
   a paper loading unit configured to load the paper sheet on which an image is to be printed by the printing unit,
at least one of the printer and the computer includes
   an input unit configured to input at least one of data on a sheet size or data on a medium type of the paper sheet loaded on the paper loading unit,
   a first determination unit configured to determine whether one of the plurality of print types is settable or not to the paper sheet loaded on the paper loading unit, based on the data input by the input unit,
   a first receiving unit configured to receive a setting of at least one of the print types determined to be settable by the first determination unit and inhibit a setting of at least one of the print types determined to be unsettable by the first determination unit,
   a second determination unit configured to determine whether one of the plurality of print functions is settable or not to the paper sheet loaded on the paper loading unit, based on the data input by the input unit,
   a second receiving unit configured to receive a setting of at least one of the print functions determined to be settable by the second determination unit and inhibit a setting of at least one of the print functions determined to be unsettable by the second determination unit, and
a controller configured to perform printing of an image by the printing unit on the paper sheet loaded on the paper loading unit, in accordance with the data input by the input unit, the print type received by the first receiving unit, and the setting of the print function received by the second receiving unit, wherein
   the controller controls the display unit so that the display unit displays a preview of an image to be printed by the printing unit, a selection key used for entering zoom-in/out as a print function when being depressed, and a selection key showing feed levels included in the printer as well as whether printing can be performed or not with a selected print function for each feed level when being depressed, and
   the controller controls the display unit so that the display unit displays feed levels for which print functions are determined to be settable and unsettable based on the input sheet size and medium type, when the controller detects the depression of the selection key used for entering zoom-in/out as a print function and the depression of the selection key showing feed levels included in the printer as well as whether printing can be performed or not with a selected print function for each feed level.

* * * * *